United States Patent [19]
Müller et al.

[11] Patent Number: 5,267,784
[45] Date of Patent: Dec. 7, 1993

[54] ANTI-LOCKING CONTROL SYSTEM

[75] Inventors: Elmar Müller, Markgröningen, Fed. Rep. of Germany; Werner Müller, Yokohama, Japan; Jürgen Jung, Zweibrücken, Fed. Rep. of Germany

[73] Assignee: Robert Bosch GmbH, Stuttgart, Fed. Rep. of Germany

[21] Appl. No.: 688,612

[22] PCT Filed: Nov. 16, 1989

[86] PCT No.: PCT/EP89/01379
§ 371 Date: Jun. 10, 1991
§ 102(e) Date: Jun. 10, 1991

[87] PCT Pub. No.: WO90/06251
PCT Pub. Date: Jun. 14, 1990

[30] Foreign Application Priority Data
Dec. 8, 1988 [DE] Fed. Rep. of Germany ....... 3841296

[51] Int. Cl.⁵ .............................................. B60T 8/32
[52] U.S. Cl. ...................................... 303/103; 303/100
[58] Field of Search ............ 303/91, 100, 92, 102-111, 303/20, 93-98; 188/181 A, 181 C; 364/426.02, 426.03, 426.01

[56] References Cited

U.S. PATENT DOCUMENTS

| 3,811,082 | 5/1974 | Sutton | 303/105 X |
| 3,899,215 | 8/1975 | Sutton | 303/92 |
| 3,936,941 | 2/1976 | Hiscox | 303/105 |
| 4,018,486 | 4/1977 | Sutton | 303/97 |
| 4,585,280 | 4/1986 | Leiber |  |
| 4,701,855 | 10/1987 | Fennel | 303/105 X |
| 4,718,736 | 1/1988 | Fennel et al. | 303/105 X |
| 4,733,920 | 3/1988 | Pannbacker | 303/106 |
| 4,738,491 | 4/1988 | Sato | 303/106 |
| 4,741,580 | 5/1988 | Matsubara et al. | 303/105 |
| 4,774,977 | 11/1988 | Fink et al. | 303/119 R |
| 4,807,133 | 2/1989 | Shimanuki et al. | 303/105 X |
| 4,870,582 | 9/1989 | Hoashi et al. | 303/105 X |
| 4,929,034 | 5/1990 | Braschel et al. | 303/103 |
| 4,965,729 | 10/1990 | Häfner | 303/103 X |
| 4,992,945 | 2/1991 | Kumpfmueller | 303/103 X |

FOREIGN PATENT DOCUMENTS

| 2251785 | 4/1973 | Fed. Rep. of Germany . |
| 2801326 | 7/1979 | Fed. Rep. of Germany . |
| 3709158 | 10/1987 | Fed. Rep. of Germany . |
| 1592595 | 6/1970 | France . |
| 2214616 | 8/1974 | France . |
| 2568202 | 1/1986 | France . |
| 1405413 | 9/1975 | United Kingdom . |

*Primary Examiner*—Douglas C. Butler
*Attorney, Agent, or Firm*—Felfe & Lynch

[57] ABSTRACT

Evaluation circuit for processing wheel speed signals and controlling brake pressure compares control cycle times to detect when wheel vibrations are present. When cycle times are approximately equal, oscillations are present, and the system is switched to a special operating mode in which pressure reduction is prevented in subsequent control cycles, and pressure buildup or pressure maintenance is initiated in a phase shifted manner.

2 Claims, 2 Drawing Sheets

ANTI-LOCKING CONTROL SYSTEM

PRIOR ART

DE-OS 22 51 785, to which British Patent No. 1,405,413 corresponds, discloses an anti-locking control system in which there is provided an inhibiting circuit which, in its activated position, prevents a pressure reduction signal produced by the evaluation circuit of the anti-locking controller from actually triggering the pressure reduction if the pressure reduction signal occurs only shortly after the end of an acceleration signal. The inhibiting circuit is activated by the acceleration signal and a timing element ensures that it remains for a predetermined time in its position preventing a pressure reduction even after the ending of the acceleration signal. This inhibiting circuit is operative after each acceleration signal resulting from a pressure reduction. It is intended to prevent a pressure reduction, which starts again very rapidly in the presence of wheel oscillations, and a consequent underbraking of the vehicle.

SUMMARY OF THE INVENTION

In the invention the pressure reduction after the end of the acceleration signal is not automatically prevented for a time in each control cycle. Rather a test is first performed to ascertain whether an oscillation is present and a selective reaction triggered only if this assessment is positive. The invention starts from the realisation that in the presence of an oscillation the cycle times are approximately equal. The oscillation detection according to the invention has a short response time and has an adaptive behaviour. Misinterpretation in the detection of oscillation is largely avoided. The measures initiated damp the oscillations.

DETAILED DESCRIPTION OF THE PREFERRED EMBODIMENTS

Figure 1:
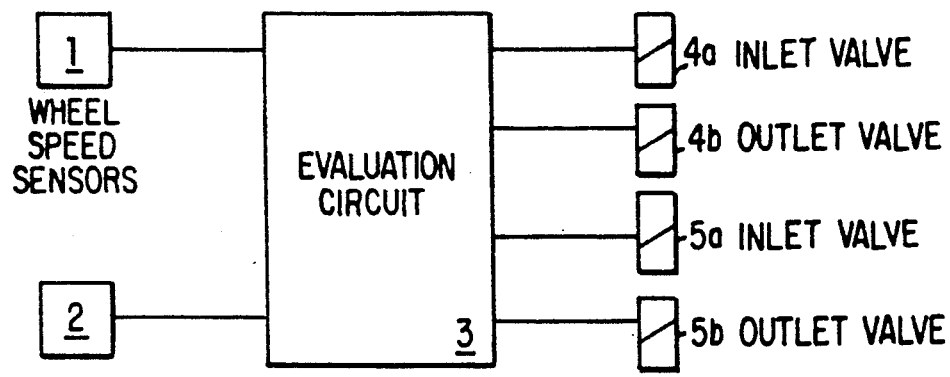
FIG. 1 shows a block diagram of an anti-locking controller.
Figure 2:
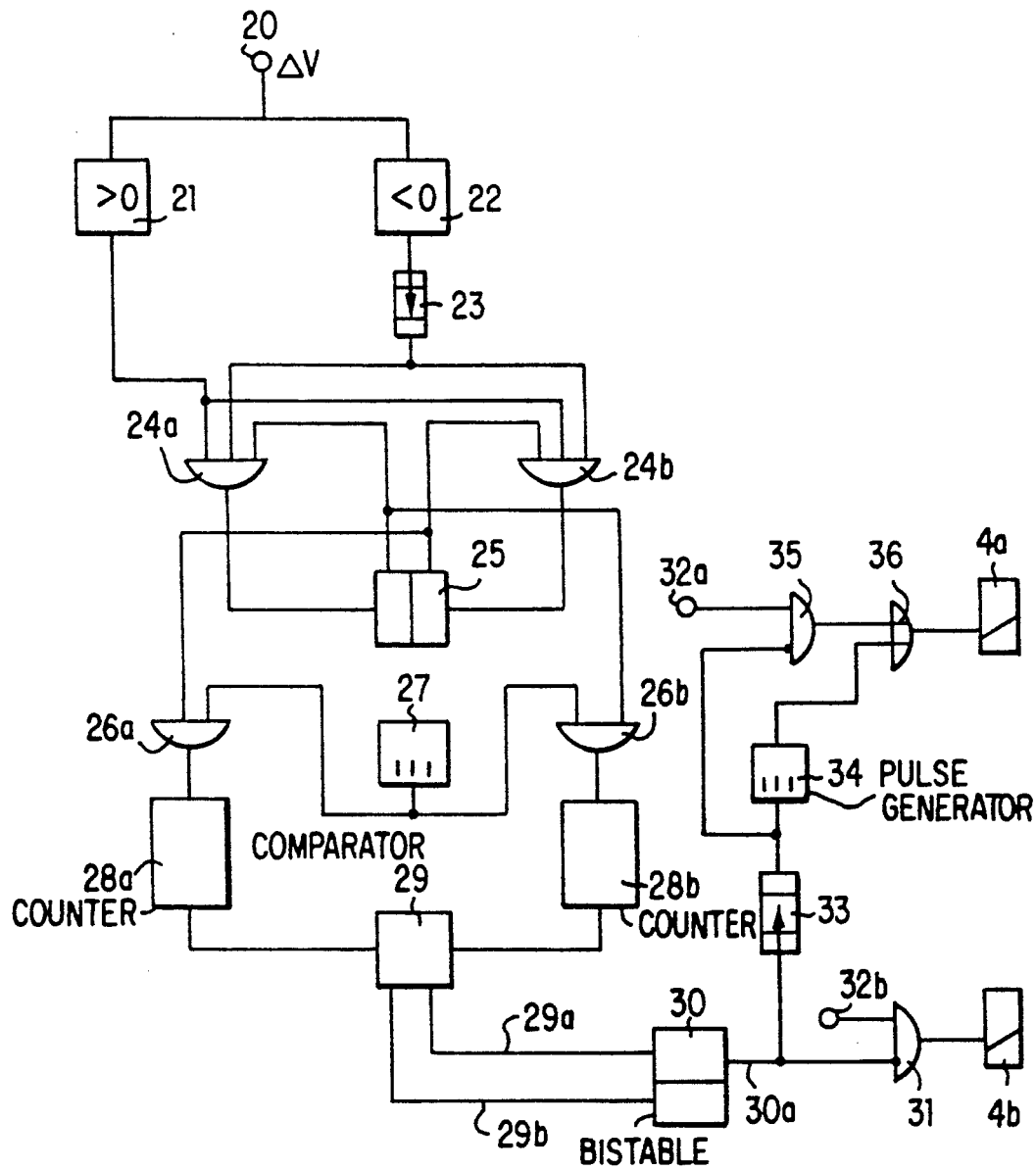
FIG. 2 shows a block diagram of an illustrative embodiment for the implementation of the inventive idea and its further developments.

FIG. 1 shows a two-channel anti-locking control system comprising two wheel speed sensors 1 and 2, an evaluation circuit 3 and two brake-pressure control arrangements, each of which comprises an inlet valve 4a and 5a respectively and an outlet valve 4b and 5b respectively. Each valve pair 4a, 4b and 5a, 5b permits build-up, maintenance, and reduction of brake pressure at a respective wheel. It may be assumed that the evaluation circuit is digital in operation, thus, the wheel speed $V_R$ is redetermined for each of the two wheels at intervals corresponding to the operating cycle, e.g. $V_{R(n-1)}$, $V_{R(n)}$, $V_{R(n+1)}$, where (n−1), (n) and (n+1) denote clock time instants. In the evaluation circuit 3, the speed change $\Delta V = V_{R(n-1)} - V_{R(n)}$ is also determined from clock time instant to clock time instant. This $\Delta V$ is fed in at a terminal 20 of the circuit of FIG. 2.

In blocks 21 and 22, a test is performed to ascertain whether the $\Delta V$ present in the particular case is positive or negative and a signal is in each case output if the test is positive. The output signal of block 22 which occurs in the case of a negative $\Delta V$ is passed to a time-delay element 23, the delay time of which is somewhat greater than the clock time. An AND gate 24a becomes conducting if a signal from a bistable element 25 is present and if block 21 outputs a first signal because of the occurrence of a positive $\Delta V$ and block 23 output a second signal indicating a time delayed negative $\Delta V$. The output signal of the AND gate 24a now switches the bistable element 25 over, with the result that it now supplies a signal to a second AND gate 24b. This signal also passes to an AND gate 26a, which now allows counting pulses of a pulse generator 27 through to a counter 28a. The counting of the pulses in the counter 28a is terminated if a signal occurs again at the output of block 21 and the signal at the output of the timing element 23 is still present. This time, AND gate 24b becomes conducting, resetting the bistable element 25 back into the initial position. An AND gate 26b now becomes conducting for the pulses of the pulse generator 27, the pulses of which are now counted in a counter 28b.

Figure 3:
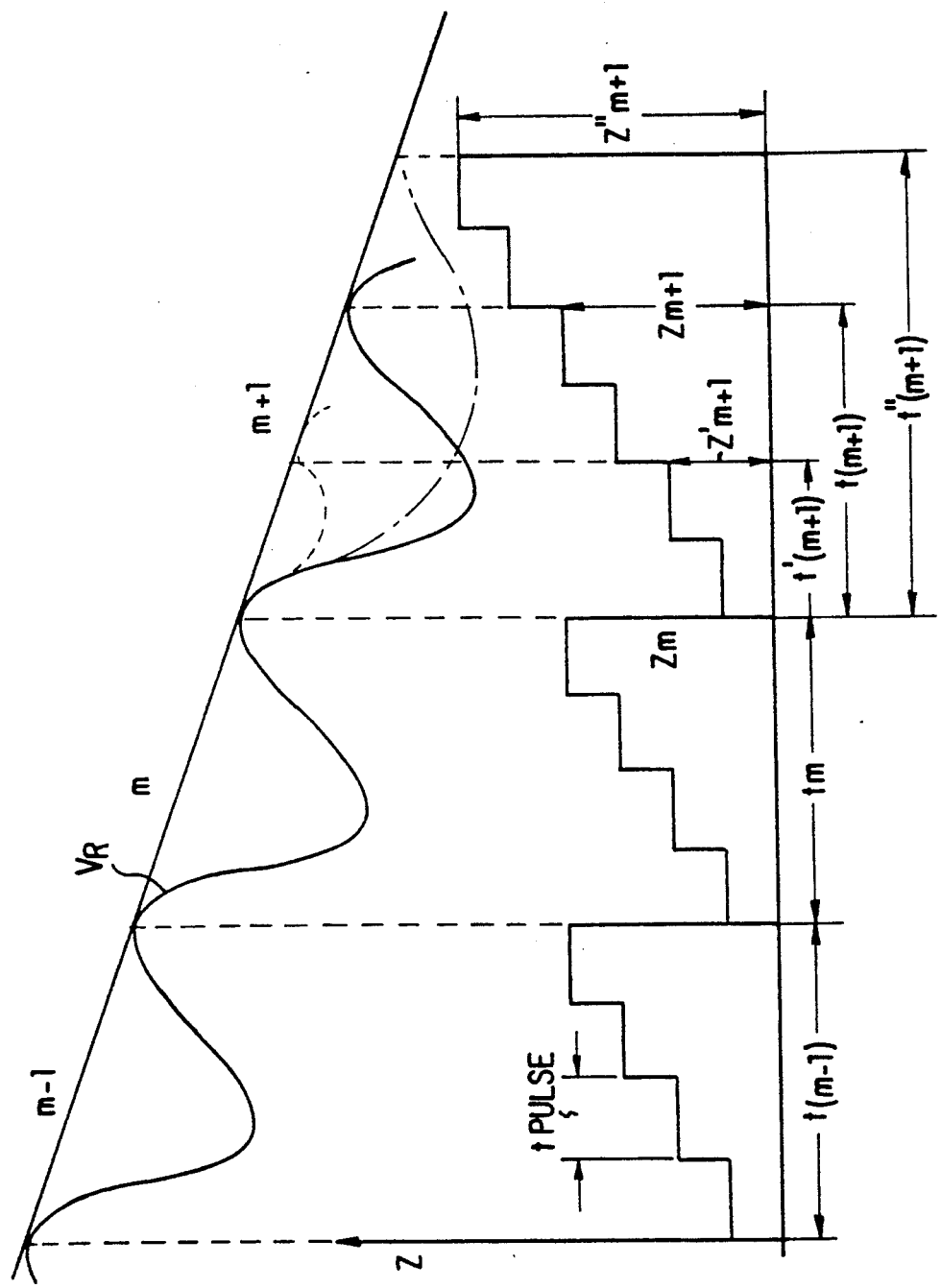
FIG. 3 shows a diagram for the purpose of olucidation.

FIG. 3 shows the characteristic of the wheel speed $V_R$ against time. It is evident from FIG. 3 that the signals of block 21 and of the timing element 23 in each case only occur together at the maxima of the $V_R$ characteristic and then make one of the AND gates 24a or 24b conducting. Let it be assumed that AND gate 24a became conducting at the beginning of the $(m-1)^{th}$ control cycle. At the end of the $(m-1)^{th}$ cycle, the counting resulting Z in the counter 28a corresponds to the cycle duration $t(m-1)$. The reoccurrence together of the output signals of block 21 and the timing element 23 at the beginning of the $m^{th}$ cycle makes the AND gate 24b conducting and switches the bistable element 25 back. The pulses of the pulse generator 27 are now counted into the counter 28b. At the end of the cycle duration, the counting result Z present there corresponds to the time tm. If the results of counters 28a and 28b are approximately the same, i.e., representing less than a first predetermined time, a comparator 29 outputs a signal on line 29a, which brings a bistable element 30 into the position in which a line 30a carries a signal. This signal inhibits an AND gate 31 and thus prevents the outlet valve 4b from being opened by the evaluation circuit 3, via a terminal 32b, for the purpose of pressure reduction. This signal is also fed to a delay element 33, the delay time of which should be about $t_m/2$ (second predetermined time). For this purpose, the timing element 33 could be correspondingly influenced by counter 28b (not illustrated). After the delay time of the timing element 33 (second predetermined time), this timing element outputs a signal which activates a pulse generator 34 and inhibits an AND gate 35. This prevents the inlet valve 46 from being closed by the evaluation circuit 3, via the terminal 32a. In the $(m+1)^{th}$ cycle, via an OR gate 36 and the inlet valve 4a, the pulse generator thus brings about a pulsed pressure build-up or brings about pressure maintenance.

In the (m+1) cycle, counting is again performed in counter 28a. If the cycle duration (counter contents) is markedly smaller, e.g. Z'm+1>Zm/2 (dashed curve) or markedly larger, e.g. Z'm+1<Zm (chain-dotted curve), the comparator 29 outputs a signal on line 29b and resets the bistable element 30. Normal operating mode thus prevails again. Without such a signal, the special operating mode is maintained and pressure reduction may be inhibited.

We claim:

1. Antilocking control system of the type comprising wheel speed sensors and brake pressure control devices assigned to the vehicle wheels, and an evaluation circuit which receives wheel speed signals from said sensors and produces control signals for controlling said brake pressure control devices in successive control cycles each having a duration and comprising a pressure reduction phase, a pressure maintenance phase, and a pressure build-up phase, said evaluation circuit comprising means for determining the duration of two successive control cycles which are followed by a subsequent control cycle, means for comparing the durations of said successive control cycles, means for preventing a pressure reduction phase in the subsequent cycle and initiating a pressure maintenance phase in the subsequent cycle when the durations of the two successive control cycles differ by less than a first predetermined time.

2. Antilocking control system as in claim 1 further comprising means for determining when said pressure maintenance phase exceeds a second predetermined time, and means for initiating a pressure build-up phase when said pressure maintenance phase exceeds said second predetermined time.

* * * * *